No. 782,843. PATENTED FEB. 21, 1905.
E. P. GEIB.
LARD PRESS.
APPLICATION FILED NOV. 5, 1903.

2 SHEETS—SHEET 1.

Witnesses

Inventor
E. P. Geib.

No. 782,843. PATENTED FEB. 21, 1905.
E. P. GEIB.
LARD PRESS.
APPLICATION FILED NOV. 5, 1903.
2 SHEETS—SHEET 2.
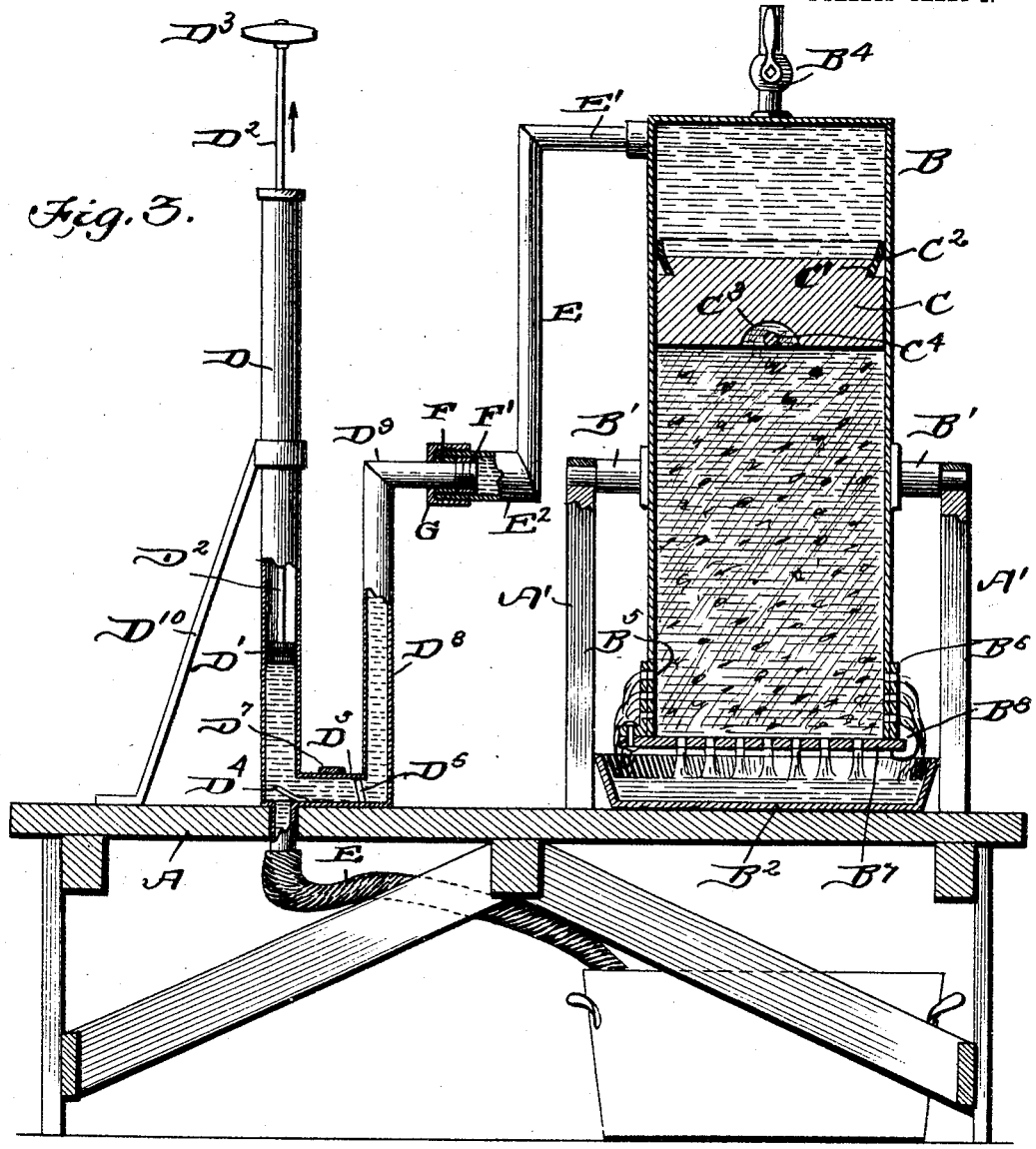
Witnesses
Inventor
E. P. Geib.
By
Attorneys No. 782,843.

Patented February 21, 1905.

UNITED STATES PATENT OFFICE.

ELI P. GEIB, OF REISTVILLE, PENNSYLVANIA.

LARD-PRESS.

SPECIFICATION forming part of Letters Patent No. 782,843, dated February 21, 1905.

Application filed November 5, 1903. Serial No. 179,974.

*To all whom it may concern:*

Be it known that I, ELI P. GEIB, a citizen of the United States, residing at Reistville, in the county of Lebanon and State of Pennsylvania, have invented a new and useful Improvement in Lard-Presses, of which the following is a specification.

This invention relates to a hydraulic press adapted for use in the manufacture of lard on either a large or small scale and for purposes of illustration is shown as a manually-operated or hand press. Much lard of the kind known as "home-made" lard has a disagreeable odor, due to the fact that it was fried too long, the frying process having been carried to too great a length in order to render the lard the more easily separated from the cracklings under a moderate pressure; but by using a greater pressure more lard can be obtained and the frying process shortened, thus saving fuel and producing a quality of lard superior to that fried too long without diminishing the quantity.

The object of my invention is a press of this character in which a maximum of pressure will be gained with a minimum of cost, the device having but few parts and being readily operated by hand-power.

My invention consists in various novel features of construction and combination of parts hereinafter described, particularly pointed out in the claims, and shown in the accompanying drawings, in which—

Figure 1:
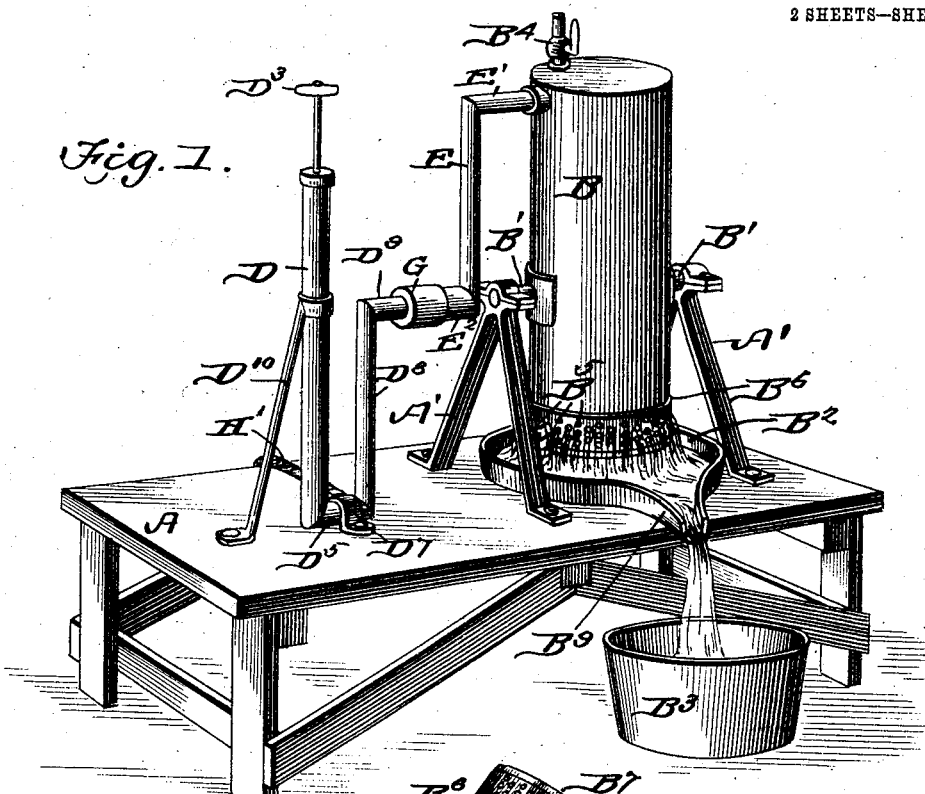
Figure 2:
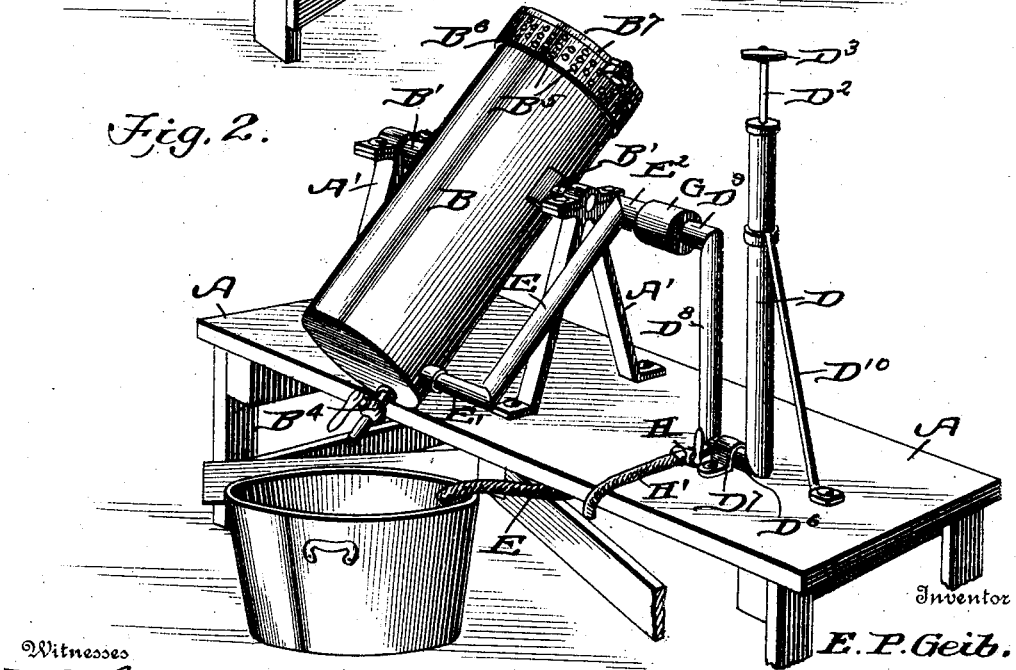

Figure 1 is a perspective view of my press, showing same in operation. Fig. 2 is a perspective view showing the cylinder inverted for the purpose of draining off the water. Fig. 3 is a vertical section, parts being shown in elevation. Fig. 4 is a detail perspective view of the bottom of the cylinder and means of locking same in position, the cylinder being inverted. Fig. 5 is a perspective view of the piston.

In the drawings, A represents a suitable bench, on which is arranged a bracket comprising the uprights A'. The cylinder B is pivotally suspended at a point below its longitudinal center between these uprights, as shown at B'. By this means when the cylinder is in an inverted position, as shown in Fig. 2, the upper edge of the cylinder will bear on the bench; but when upright in its normal position, as shown in Figs. 1 and 3, the perforated bottom of the cylinder will be some distance above the bench, and a pan $B^2$ is arranged on the bench between the uprights A' and receives the lard forced through the perforations of the bottom, the lard escaping through a lip $B^9$ in the pan into a suitable receptacle $B^3$, arranged adjacent to and below the level of the bench.

Referring in detail to the cylinder B, it will be noted that it is closed at its upper end and the top carries a faucet $B^4$, through which the water forced into the cylinder may be drawn off. Adjacent its lower end the cylinder is perforated, as shown at $B^5$, and over this perforated portion fits a circular sleeve or band, also perforated and serving to strengthen the cylinder and enable it to withstand the pressure to which it is subjected. The bottom $B^7$ is pivotally connected to a lug carried by the band $B^6$ and opens by turning on this pivot-point. When turned so as to close the bottom of the cylinder, the bottom plate $B^7$ is engaged by a hook or clamp $B^8$, carried by the band diametrically opposite the lug above mentioned.

Arranged within the cylinder is a piston-head constructed of a wood which will not readily expand when in contact with a liquid, and the upper portion of the piston-head C has a reduced portion C', which has a beveled periphery, to which is secured a flaring leather collar $C^2$. This collar extends upward above the piston C and when the pump is in operation is forced by the pressure of the water against the sides of the cylinder B, so that should the piston head or sides of the cylinder become worn water will not be forced downward into the lard, the collar $C^2$ forming a packing-ring.

The pump D is arranged vertically on the bench and is of a very small diameter compared with the diameter of the cylinder B. It is held rigid by a suitable brace-rod $D^{10}$ and comprises a piston D', upwardly-projecting piston-rod $D^2$, and a handle or hand-grasp $D^3$, which latter can be omitted when the pump is operated other than manually.

The pump D opens downwardly through the bench, and at its lower end is secured a hose E, adapted to supply the pump with water from any suitable source. In this lower portion of the pump is a suitable check-valve D⁴, adapted to permit the entrance of water into the pump and to prevent its outflow except through the lateral branch D⁵. The branch D⁵ is also provided with a check-valve D⁶. As shown in Figs. 1 and 2, the branch pipe is held firmly in place by a clamp D⁷, bolted or otherwise secured to the bench. To the branch pipe D⁵ is coupled or otherwise connected a vertical pipe D⁸, rising to a height equal to that of the uprights A'. This last-mentioned pipe has an elbow D⁹ in horizontal alinement with the trunnions pivotally supporting the cylinder B. A vertical pipe-section E is connected by an elbow E' to the upper portion of the cylinder and at its lower end has an elbow E², which fits loosely over the elbow D⁹, a suitable packing F being arranged between the two elbows and held in place by a collar F', threaded on the outer end of the elbow D⁹, and by a flanged collar G, threaded on the outer end of the elbow E². This construction provides a revoluble joint and permits the tipping of the cylinder B without disconnecting any of the pipes. A recess C³ is formed in the under side of the piston-head, across which extends a cross-bar C⁴, serving as a hand-grasp by which the piston-head may be readily handled in drawing from the cylinder or in cleaning. A faucet H is arranged in the branch D⁵ between the pump-barrel and the check-valve D⁶, to which is connected a tube H', through which the pump may be drained when the pressing operation is finished.

The material from which the lard is to be pressed is placed in the cylinder B over the piston when the cylinder is in an inverted position. The bottom plate is then closed and fastened in place and the cylinder tipped back to its normal vertical position and pressure applied to the piston through the operation of the pump. The lard will be forced out of the cylinder through the perforations in its lower portion and the bottom plate and will run into the pan, from which it will escape through the lip into the receptacle provided to receive it.

Having thus fully described my invention, what I claim as new, and desire to secure by Letters Patent, is—

1. A lard-press comprising a cylinder adapted to normally remain suspended in a vertical position said cylinder being closed at the top and having its sides perforated adjacent the bottom, a perforated band encircling the perforated portion of the cylinder, said band having an outwardly-projecting lug, a perforated bottom plate pivoted to the lug, a clamp carried by the band on the side opposite the lug and adapted to engage the bottom plate, a piston in the cylinder, and means for applying hydraulic pressure to the piston.

2. A lard-press comprising a cylinder pivotally suspended intermediate its ends and perforated below the point of suspension, said cylinder being closed at its upper end, a pivoted, perforated bottom carried by the cylinder, a fixed pipe-section, a pipe-section secured rigidly to the cylinder and loosely to the fixed pipe-section, means for forcing water through the pipe-section, and a piston in the cylinder.

3. A lard-press of the kind described comprising parallel uprights, a cylinder pivotally supported between said uprights the pivotal point being nearer the bottom of the cylinder than the top, the said cylinder having a perforated bottom and perforated sides adjacent the bottom, a piston in the cylinder, a revolubly-jointed pipe leading to the upper portion of the cylinder, a faucet in the top of the cylinder, and means for forcing water through the pipe into the cylinder under pressure.

4. A lard-press comprising a hand-operated pump, a cylinder pivotally supported between suitable uprights and adapted to be inverted, said cylinder having a pivoted, perforated bottom and perforated sides adjacent the bottom, a piston in the cylinder, a supply-pipe connected to the pump, a check-valve therein, a vertical pipe having an elbow at its lower end communicating with the pump-barrel and an elbow at its upper end in horizontal alinement with the pivotal point of the cylinder, a check-valve in the lower elbow, a vertical pipe having an upper elbow connected to the upper portion of the cylinder and a lower elbow adapted to fit over the upper elbow of the first-mentioned vertical pipe, means for draining the pump-barrel, and a faucet arranged in the upper end of the cylinder, as and for the purpose described.

ELI P. GEIB.

Witnesses:
N. P. GIBBLE,
M. L. HARTMAN.